March 9, 1926.                R. C. BROWNE                1,576,086
                           HEATING APPLIANCE
                    Filed March 11, 1921    2 Sheets-Sheet 2

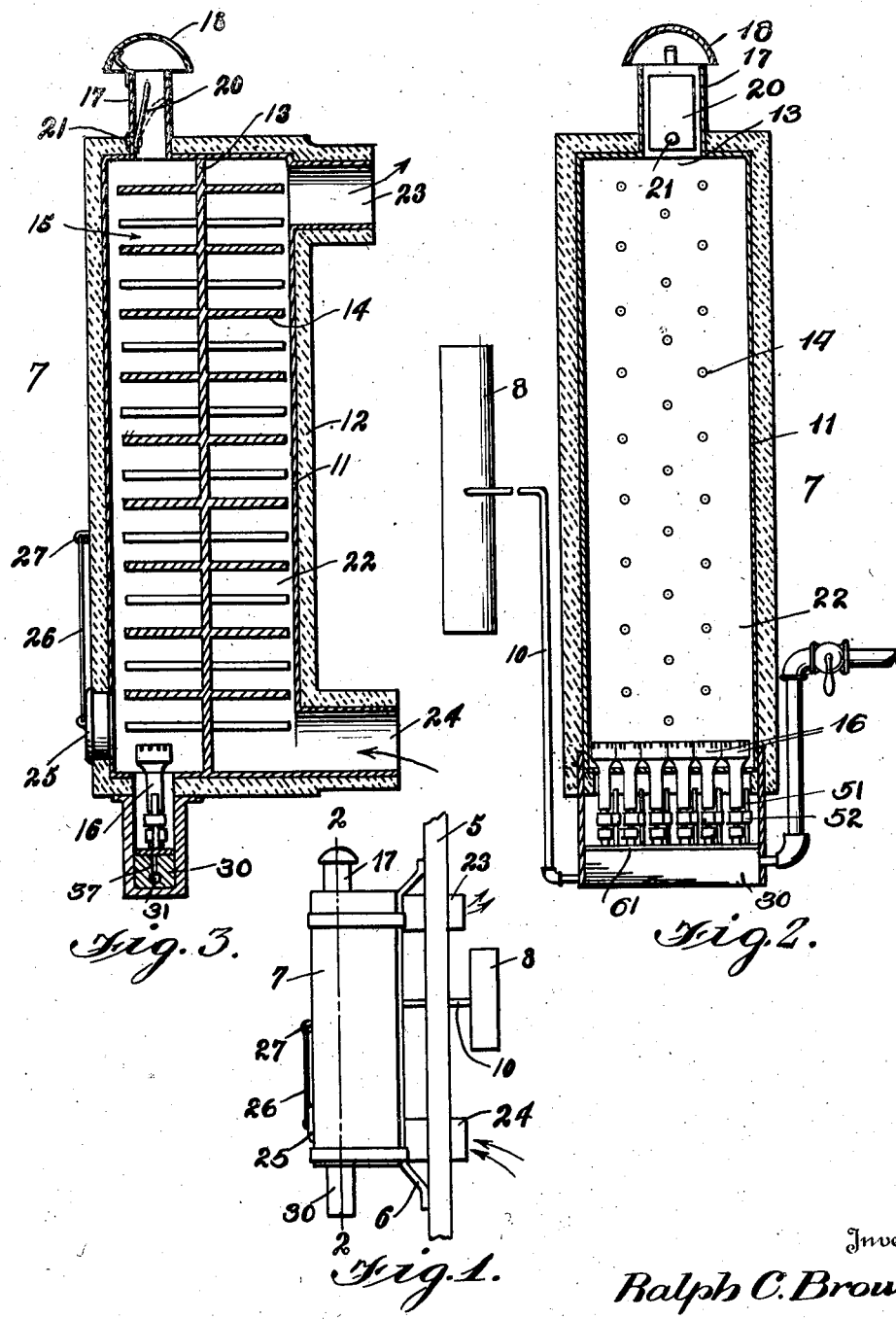

Inventor
Ralph C. Browne
By Browne & Phelps
Attorneys

Patented Mar. 9, 1926.

1,576,086

UNITED STATES PATENT OFFICE.

RALPH C. BROWNE, OF SALEM, MASSACHUSETTS.

HEATING APPLIANCE.

Application filed March 11, 1921. Serial No. 451,560.

*To all whom it may concern:*

Be it known that I, RALPH C. BROWNE, a citizen of the United States, residing at Salem, in the county of Essex and State of Massachusetts, have invented certain new and useful Improvements in Heating Appliances, of which the following is a specification.

This invention relates to improvements in heating appliances and more particularly to a heating appliance, device or system intended to furnish heat to buildings, or chambers, such as garages, for example, containing inflammable material and where it is inconvenient to heat such buildings, or chambers, by the usual steam heating system.

One of the objects of the present invention is to provide a heating appliance or apparatus of simple and practical construction that will operate with the highest degree of safety to the contents of the building, or chamber, to be heated.

Another object of the invention is to provide an efficient appliance of the above type particularly adapted to use the heating fuel consumed with the greatest economy.

A further object is to provide a heating appliance which will be largely automatic in its operation in the regulating of the amount of fuel consumed and the heat generated.

A further object is to provide an appliance of the above general character with certain safety devices, such as insuring the proper burning of the fuel though the burner may be improperly lighted.

A further object is to provide an appliance of the above general character which may be inexpensively manufactured, assembled and installed. Other objects will be in part obvious and in part hereinafter pointed out.

The invention accordingly consists in the features of construction, combination of parts and in the unique relation of the members and the relative proportioning and disposition thereof, all as more completely hereinafter outlined.

To enable others skilled in the art to fully understand and comprehend the underlying features of this invention and in order that they may embody the same by numerous modifications in the structure and relation contemplated by this invention, drawings depicting a preferred form have been annexed and made part of this disclosure and in such drawings like reference characters denote corresponding parts throughout all of the views, in which Figure 1 is a semi-diagrammatic view, or side elevational view, showing complete appliance as applied to the wall of a building.

Figure 2 is a vertical sectional view taken substantially on the line 2—2, Figure 1.

Figure 3 is a vertical sectional view taken substantially on the same line but at right angles thereto.

Figure 4:
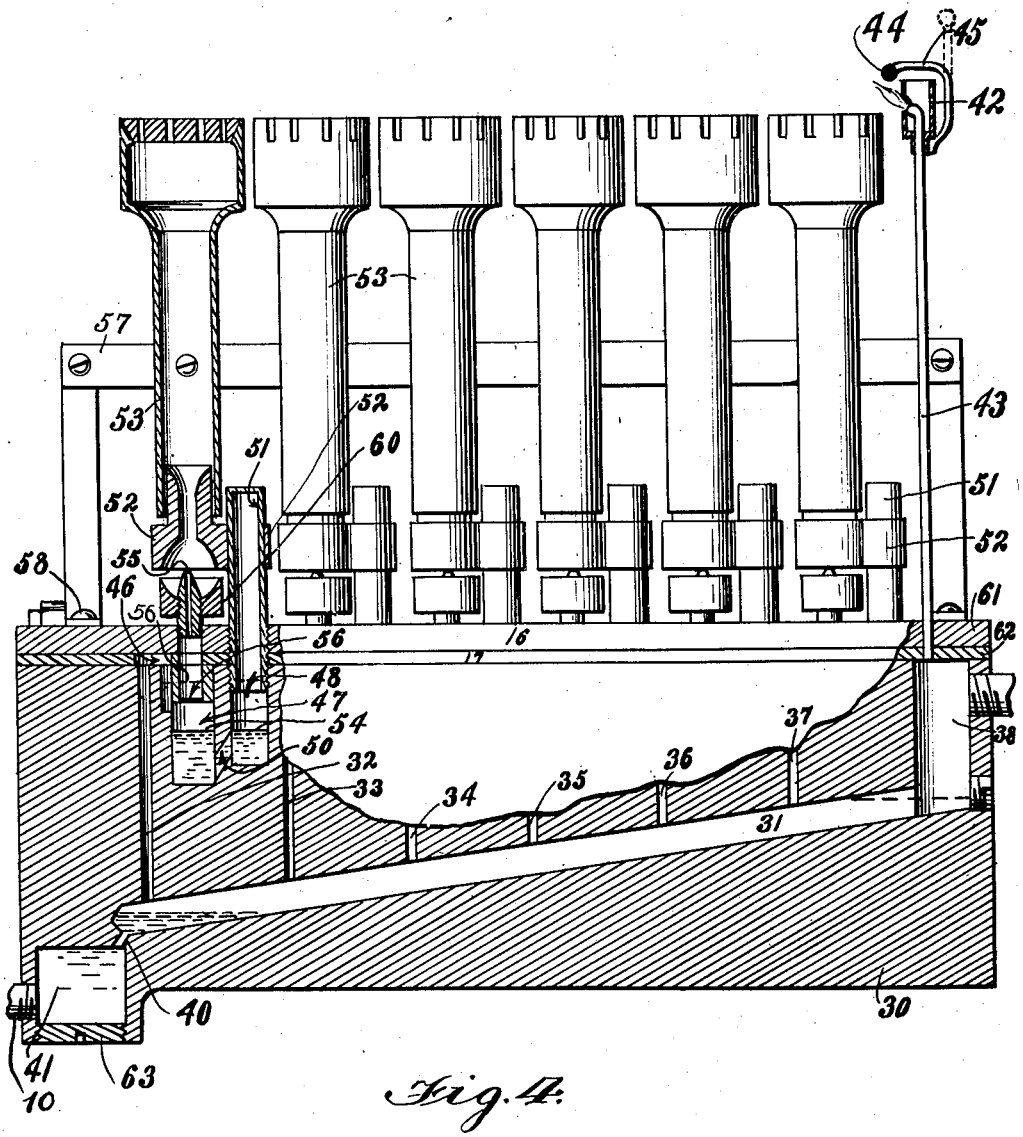
Figure 4 is a vertical sectional view of the burner unit.

Referring now to these drawings in detail and more particularly to Figure 1, 5 denotes the wall of a building, or garage, for example, on the outside of which is secured, by means of brackets 6, a heating unit 7, while on the inside of the wall 5 is positioned a sealed tank 8 connected with the heating unit by means of a pipe 10 for regulating the operation of the burner according to the temperature of the interior of the room.

The heating unit 7 preferably comprises a casing of fire proof material, such as metal, indicated at 11 and covered with a heat insulated material such as asbestos 12. This heating casing is preferably rectangular in shape and divided transversely to form two separated chambers by a vertical partition 13 from opposite sides of which extend projections, or bosses 14, preferably directly opposite each other and formed integrally with the partition.

At the lower part of one compartment 15, I provide a burner unit 16, comprising a series of burners shown more clearly in Figure 4 and more fully hereinafter described. At the upper part of this compartment 15 is a stack, or vent 17, provided with a cover 18, to exclude rain and dirt and an automatic damper 20 which may comprise a sheet of thermostatic metal (brass and iron riveted together), secured at one edge 21 in any desired manner to the side of the stack 17, as shown. The purpose of this thermostatic damper is to prevent an excessive waste of heat after the burners are well started, the increase in temperature causing the damper to swing or bend over and close the stack.

The other compartment 22 is provided with flues 23 and 24 at the top and bottom which flues pass through the wall of the building and form a circulating channel for the heat in the manner indicated by the arrows. That is, the cold air from the lower part of the garage enters through flue 24, passes over and between the projecting bosses 14 and thence out through flue 23 at the top. It will be noted that there are no openings between the compartments 15 and 22 and that hot gases and flame from the burner 16 ascending through the compartment 15, give up their heat to the wall 13 and bosses 14, which by conduction heat the bosses 14 in the compartment 22, which in turn deliver up their heat to the air passing thereover from the flue 24 to the flue 23. Convexion gives rise to a continuous movement of the air and the present arrangement has been found to operate very efficiently and rapidly without undesirable loss of heat.

For the purpose of observing the condition of the burner and insuring against explosion of gas in the chamber 15, there is provided a gravity closing door 25, comprising a slab of non-combustible material such as slate, pivoted on the lower end of an arm 26, which in turn pivots from a supporting lug 27, thereby permitting an automatic closing of the door at all times.

The burners herein shown and described preferably comprise a plurality of special Bunsen burners so associated with each other and the source of gas supply and thermostatic pneumatic chamber 8, that one or more burners are brought into use depending upon the temperature of the interior of the chamber to be heated and the amount of heat required, and, inversely, one or more of these burners are put out automatically as the temperature of the chamber to be heated attains the desired degree.

All the burners of the Bunsen type, so far as known, have the inherent defect that when first lighted and subjected to fluctuating gas pressure, they are very apt to "snap back," or burn at the base, resulting in very imperfect combustion and destructive heating of the burner. In the present burner this limitation is recognized and means are provided to overcome the same by automatically shutting off the burner that is ignited at the base and retaining the same in shut off condition until it has cooled to proper working condition, whereupon the burner is automatically relighted.

The above conditions are preferably realized by providing a metallic base block 30, provided with the inclined port 31 bored out in the manner shown in Figure 4. From this port rise a plurality of smaller ports, 32—37 inclusive. The upper end of port 31 communicates with the larger port 38, connected with the gas main while the lower end of port 31 communicates through a small port 40 with a chamber 41, connected with the air-tight tank or reservoir 8, through pipe 10, as shown in Figure 1.

A suitable quantity of heavy fluid, such as mercury, for example, is placed in port 31 and communicates with chamber 41 and is adapted to cover all of the ports 32—37, inclusive, at a predetermined temperature, when it is desired that all of the burners should be out as would be the case if the temperature of the chamber to be heated were equal or greater than the temperature desired.

It will be obvious that if the temperature surrounding tank 8 within the chamber to be heated, lowers, it will in turn cool the air within the tank, thereby decreasing its volume and lessening the pressure upon the mercury within the tank 41, causing the same to move out through port 40, uncovering one or more of the ports 32—37, inclusive, and permitting the gas from the main 38 to pass, first, to the burner port 37, thence to 36, and so on. Upon the temperature rising within the room to be heated, the air in the tank 8 expands and forces the mercury up the port 31, thereby cutting off the gas to the burners through ports 32—37 inclusive. By giving the air tank 8 the proper size, the entire set of the burner can be operated within any desired reasonable range of temperature.

A pilot light 42 is preferably provided adjacent the first burner supplied through port 37, this light being supplied with gas through a pipe 43 and connected with the gas main at the upper part of the chamber, or port 31, unaffected by any movements of the mercury therein. In the event that the pilot light becomes accidentally extinguished by reason of a failure of the gas supply, or draft of air, a small piece of platinum b'ack is provided for automatically relighting the pilot light when the flow comes on. This platinum black is preferably mounted to turn on a piece of thermostatic metal which swings to the dotted line position while the burner is lighted.

The details of the construction of each burner are substantially the same and are best shown at the left of Figure 4. The port 32 is provided with a reverse bend 46, at its upper end and connects with a chamber 47, some distance down the side as shown. Associated with this chamber or port 47, is a second or larger port 48, the connection between the two being a downwardly inclined passage 50. Into the port or chamber 48, is screwed a sealed tube 51, containing air or gas. To this tube is clamped a composition bushing 52 situated at the lower end of the burner 53 but separated from it. A quantity of mercury is contained in ports 47 and 48, as indicated by the heavy black line 54. This mechanism constitutes the automatic shut off which operates to cut off the supply of fuel to the burner when the burner is improperly ignited, as for example, when the gas becomes ignited upon its emission from the gas supply ports. When this occurs the flame is at the end of the burner tip 55, whereupon the bushing 52 becomes heated to a high degree and in turn heats the sealed tube 51, causing the air contained therein to expand and force the mercury down through the passage 50, whence it rises in the chamber 47 to the dotted line 56, closing the port 32, to the chamber 47 and automatically extinguishes the burner associated therewith. As soon as this occurs the cooling process commences and the air in tube 51 contracts and the mercury is drawn back to the level indicated by line 54, again allowing the gas to flow to the burner whence it is ignited by the next adjacent burner. This operation may occur indefinitely, or until the series of burners is properly lighted.

The burner tubes 53 are preferably mounted on bar 57, which in turn is secured or bolted at 58 to the base block 30. This construction prevents the heat from the tubes being conducted to the bushings 52, as would be the case if held by them. The burner tips 55 are preferably provided with a concave nut 60 which can be screwed up or down, thereby regulating the amount of air to the burner tubes. The utilization of a tube plate 61 on the top of block 30, in connection with a gasket 62, makes the entire burner unit a simple and practical construction which may be easily manufactured and assembled.

Obviously the actual arrangement and proportioning of the parts herein shown need not be followed in the realization of the invention, as other arrangements falling within the terms of the following claims are comprehended within the scope thereof.

The degree of temperature within which the device is desired to operate may be regulated to a great extent by means of a nut 63 at the lower part of the tube, or chamber 41, which nut will regulate the level of the mercury in the port 31 for any desired temperature.

It is believed that the operation and method of use of the present invention will be clear from the above description. It may be stated, however, that when installed in the manner shown in Figure 1, the pilot burner is lighted and nut 63 is regulated so that all of the ports 32—37, inclusive, will be open at a minimum degree of desired temperature, say, for example, the freezing point.

Now with these ports all open all of the burners will be ignited. As soon as the temperature in the room to be heated rises, then the air in tank 8 expands and forces the mercury from the chamber 41 up through the port 31, automatically cutting off one burner after another as may be necessary, until the desired maximum temperature, say 45° is reached. When the chamber cools below this temperature, the port 37 is first exposed to the flow of the gas from the main and the pilot burner ignites the same. In case of a "snap back," the bushing 52 becomes heated and the heat is transmitted to the tube 51 which, as previously explained, automatically closes the upper end of the port 37, causing the burner to go out. When the parts have cooled, the flow of gas through the port 37 again takes place and the burner will probably become properly lighted.

It will thus be seen that the present invention provides a simple and practical heating system, or appliance, adapted for heating garages in winter where it is impractical to heat the same by the heating system of the house.

Without further analysis the foregoing will so fully reveal the gist of this invention that others can, by applying current knowledge, readily adapt it for various applications without omitting certain features that from the standpoint of the prior art, fairly constitutes essential characteristics of the generic or specified aspects of this invention and, therefore, such adaptations should and are intended to be comprehended within the meaning and range of equivalency of the following claims.

I claim:—

1. In apparatus of the character described, in combination, a heating unit comprising a plurality of independent burners of the Bunsen type, means for controlling the admission of gas to a number of said burners, determined by the temperature of the chamber to be heated, said means comprising a fluid heavier than the gas admitted, being displaced by variation of temperature in said chamber and operative thereby to open or close said burners to the gas.

2. In an apparatus of the character described, in combination, a heating unit comprising a plurality of Bunsen burners, and means for controlling the number of burners in operation including a heavy fluid, said fluid being displaced by variation of temperature in a chamber heated by said heating unit to thereby open or close said burners to the gas.

3. In an apparatus of the character described, in combination, a heating unit comprising a plurality of burners, means for controlling the number of burners in operation comprising a thermostatic device including a heavy fluid subjected to the temperature of the room to be heated, and means for cutting off the supply of fuel to the burners when the fuel becomes ignited upon its emission from the ports supplying the burners.

4. In an apparatus of the character described, in combination, a plurality of Bunsen burners, fluid means for controlling the operation of said burners, and pneumatic means operating on said fluid means and determining the numbers of burners in operation, said pneumatic means being exposed to the temperature of the room to be heated.

5. In an apparatus of the character described, in combination, a gas burner, a port leading to said burner, and means including a sealed tank for admitting gas to said burner through said port, said means being operated automatically in said port by the contraction of gases contained within said tank, said tank being exposed to the temperature of the room to be heated.

6. In apparatus of the character described, in combination, a gas burner, a burner block below said burner, a port in said block leading to said burner, and means including a sealed tank for admitting gas to said burner, through said port, said means being operated automatically by the contraction of gases contained within said tank to open said port, said tank being exposed to the temperature of the room to be heated, said means comprising a fluid in said port and having a variable level with respect to the burner, said variable level therein being controlled automatically by the temperature of the room to be heated.

7. In an apparatus of the character described, in combination, a gas burner, a port leading to said burner, and means including a sealed tank for admitting gas to said burner through said port, said means being operated automatically by the contraction of gases contained within said tank, said tank being exposed to the temperature of the room to be heated, said means comprising a fluid in said port having a variable level therein with respect to the burner, said variable level being controlled automatically by the temperature of the room to be heated.

8. In an apparatus of the character described, in combination, a heating unit comprising means adapted to burn fluid fuel, automatic means for controlling the amount of fluid burned comprising a plurality of ports, and a heavy liquid in operative relation to said ports adapted to successively open and close the same with variations in temperature of the room to be heated.

9. In an apparatus of the character described, in combination, a series of burners, a main port having passages leading to each burner, said main port being inclined and a relatively heavy fluid in said main port adapted to open and close the passages as the level of said fluid varies.

10. In an apparatus of the character described, in combination, a series of burners, a main port having passages leading to each burner, said main port being inclined and a relatively heavy fluid in said main port adapted to open and close the passages as the level of said fluid varies, and pneumatic means controlled by the temperature of the room to be heated for varying the level of the said fluid.

11. In an apparatus of the character described, in combination, a series of burners, a main port having passages leading to each burner, said main port being inclined and a relatively heavy fluid in said main port adapted to open and close the passages as the level of said fluid varies, and means to cut off the supply of fuel to each burner when the fuel becomes ignited as it is emitted from said passages.

12. In an apparatus of the character described, in combination, a series of burners, a main port having passages leading to each burner, said main port being inclined and a relatively heavy fluid in said main port adapted to open and close the passages as the level of said fluid varies, and means to cut off the supply of fuel to the burners when the fuel becomes ignited upon its emission from said passages, comprising a thermostatic cut off.

13. In an apparatus of the character described, in combination, a series of burners, a main port having passages leading to each burner, said main port being inclined and a relatively heavy fluid in said main port adapted to open and close the passages as the level of said fluid varies, and means to cut off the supply of fuel to each burner when the fuel becomes ignited upon its emission from said passages, said means comprising a thermostatic cut off, and means for conducting the heat away from said cut off when the burner is lighted.

RALPH C. BROWNE.